(12) United States Patent
Fischer et al.

(10) Patent No.: US 7,326,873 B2
(45) Date of Patent: Feb. 5, 2008

(54) APPARATUS AND METHODS FOR REPAIRING TENONS ON TURBINE BUCKETS

(75) Inventors: Todd Joseph Fischer, Ballston Spa, NY (US); John Francis Nolan, Cobleskill, NY (US); Andrew John Tomko, Glenville, NY (US); Dennis William Roberts, Schenectady, NY (US); Carter Steven Cook, Westford, NY (US); David Roy Parker, Worcester, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/390,235

(22) Filed: Mar. 28, 2006

(65) Prior Publication Data

US 2006/0191910 A1 Aug. 31, 2006

Related U.S. Application Data

(62) Division of application No. 10/806,426, filed on Mar. 23, 2004, now Pat. No. 7,034,262.

(51) Int. Cl.
*B23K 10/00* (2006.01)

(52) U.S. Cl. ............... 219/121.45; 219/121.46; 219/121.47; 219/121.58

(58) Field of Classification Search ........... 219/121.58, 219/121.45, 121.46, 121.47, 76.16, 76.15, 219/635–641, 643–648
See application file for complete search history.

(56) References Cited

U.S. PATENT DOCUMENTS

| 4,542,272 A | 9/1985 | Hubbard |
| 5,092,942 A | 3/1992 | Fraser et al. |
| 5,319,179 A | 6/1994 | Joecks et al. |
| 5,998,755 A * | 12/1999 | Zajchowski et al. ..... 219/76.16 |
| 6,376,801 B1 | 4/2002 | Farrell et al. |
| 2003/0066192 A1 | 4/2003 | Wilkins et al. |

OTHER PUBLICATIONS

European Search Report, dated Aug. 5, 2005, by Examiner S. Watson in Munich.

* cited by examiner

*Primary Examiner*—Mark Paschall
(74) *Attorney, Agent, or Firm*—Nixon & Vanderhye, PC

(57) ABSTRACT

Bucket tip tenons requiring refurbishment are removed from the bucket tips by grinding. Groups of buckets are clamped on a rotatable table in positions adjacent an induction heating coil and a robotic welding arm, respectively. While one group is preheated, the other group of buckets is in a welding location, enabling the welding head on the robotic arm to sequentially apply weld buildup material to the bucket tips. After applying weld buildup material in multiple passes and sequentially to the bucket tips, the buckets are removed, stress-relieved and the weld buildup material machined to provide refurbished tenons. Upon removal of the buckets from the table, the table is rotated to locate the preheated buckets in welding locations and additional buckets are clamped to the table for preheating.

7 Claims, 9 Drawing Sheets

APPARATUS AND METHODS FOR REPAIRING TENONS ON TURBINE BUCKETS

This application is a divisional of U.S. patent application Ser. No. 10/806,426, filed Mar. 23, 2004 U.S. Pat. No. 7,034,262, now allowed.

BACKGROUND OF THE INVENTION

The present invention relates to apparatus and methods for repairing damaged tenons on the tips of turbine buckets and particularly relates to apparatus and methods for repairing eroded tenons with reduced manufacturing cycle time, costs, labor and improved quality.

Turbine buckets, for example, steam turbine buckets, are typically provided with an annular cover overlying the tips of the buckets. The covers are used to dampen and stiffen the response of the buckets and also provide a circular band on which a seal can be provided. The covers are conventionally provided in arcuate segments overlying a plurality of bucket tips. In the originally manufactured bucket, one or more tenons are provided projecting from the tip of the bucket and are received in corresponding openings in the cover. The tenons are then peened or otherwise secured to the covers to retain the covers on the buckets. Over time and extended usage of the turbine, particularly steam turbines, the bucket tenons corrode away, requiring the bucket/cover assembly to be refurbished by repairing the tenons and resecuring the cover to the bucket tips.

Previously, to repair bucket tenons, the buckets were removed from the turbine with each individual bucket being placed on a workbench. The corroded tenon was then ground away down to a nub on the tip or flush with the bucket tip. The tenon tip was preheated and cleaned. Weld material was then applied to the tip manually in multiple passes, paying strict attention to the magnitude of the preheat. The weld buildup was then stress-relieved and machined to form the new or repaired tenons. This prior process was manually performed, tedious and costly, resulting in very low production rates.

BRIEF DESCRIPTION OF THE INVENTION

In accordance with a preferred embodiment of the present invention, there is provided apparatus and methods for reducing manufacturing cycle time, costs and labor and improving quality by automating the repair process. In an aspect hereof, a fixture, preferably a table, includes a plurality of clamps for clamping groups of buckets to the table, for example, in two groups of four buckets each. The buckets are thus clamped in predetermined positions on the table. One group of buckets is preheated, preferably by an induction coil, while weld material is applied sequentially to the tips of the buckets of the other group in multiple passes using a robotically carried welding head. Weld material is applied in multiple passes after temperature measurements are made for each bucket tip such that each bucket tip has sufficient preheat to enable a further welding pass. Upon completing the weld buildup for the group of buckets, the buckets are removed from the table fixture, placed in a further fixture in an inverted position and disposed in a fluidized bed for stress relief. The table fixture is also displaced to locate another group of preheated buckets into welding positions relative to the welding head carried by the robotic arm such that the weld material may be applied sequentially to the next group of preheated bucket tips in multiple passes. Substantially simultaneously, a further group of buckets are clamped to the table fixture and preheated by the induction coil. The process is repeated until all of the damaged tenons have been provided with sufficient weld build-up and stress-relieved. After stress-relief, the weld buildup at each bucket tip is machined, preferably by CNC machines, to form replacement tenons.

It will be appreciated that the buckets may be initially fixed in predetermined positions by individual clamps and not necessarily on a rotatable table. Thus, after preheating, the weld material may be applied robotically and sequentially to the preheated bucket tips in multiple passes and subsequently stress relieved and machined. The stress relief may be accomplished by any one of a variety of known techniques including the technique disclosed specifically herein.

In a preferred embodiment according to the present invention, there is provided a method of repairing tenons on the tips of turbine buckets, comprising the steps of (a) releasably securing a plurality of buckets to a fixture in predetermined positions, (b) preheating the turbine buckets, (c) applying weld material sequentially to the tips of the preheated buckets secured to the fixture in a first weld pass, (d) applying additional weld material sequentially to the tips of the buckets secured to the fixture in at least one additional pass, (e) stress-relieving the buckets and (f) machining the applied weld material to form tenons on the bucket tips.

In a further preferred embodiment a method of repairing tenons on the tips of turbine buckets, comprising the steps of: (a) fixing a plurality of buckets in predetermined positions; (b) preheating the turbine buckets; (c) applying weld material sequentially to the tips of the preheated buckets secured to the fixture in a first weld pass while the buckets are fixed in the predetermined positions; (d) applying additional weld material sequentially to the tips of the buckets in at least one additional pass while the buckets are fixed in predetermined positions; (e) stress-relieving the buckets; and (f) machining the applied weld material to form tenons on the bucket tips.

In a further preferred embodiment according to the present invention, there is provided an assembly for applying weld material to tips of turbine buckets to form one or more tenons on said bucket tips, comprising a fixture having clamps for releasably securing first and second groups of buckets in predetermined positions on the fixture, an induction coil for preheating the groups of buckets, a welding head for applying weld material to the tips of the buckets, the fixture being movable between first and second positions, the fixture in the first position thereof locating the first group of buckets adjacent the weld head enabling weld material to be applied to the tips of the buckets thereof and the second group of buckets adjacent the induction coil for preheating the bucket tips thereof, the fixture in the second position locating the second group of buckets adjacent the welding head, enabling weld material to be applied to the tips of the buckets of the second group thereof.

DETAILED DESCRIPTION OF THE INVENTION

Figure 1:
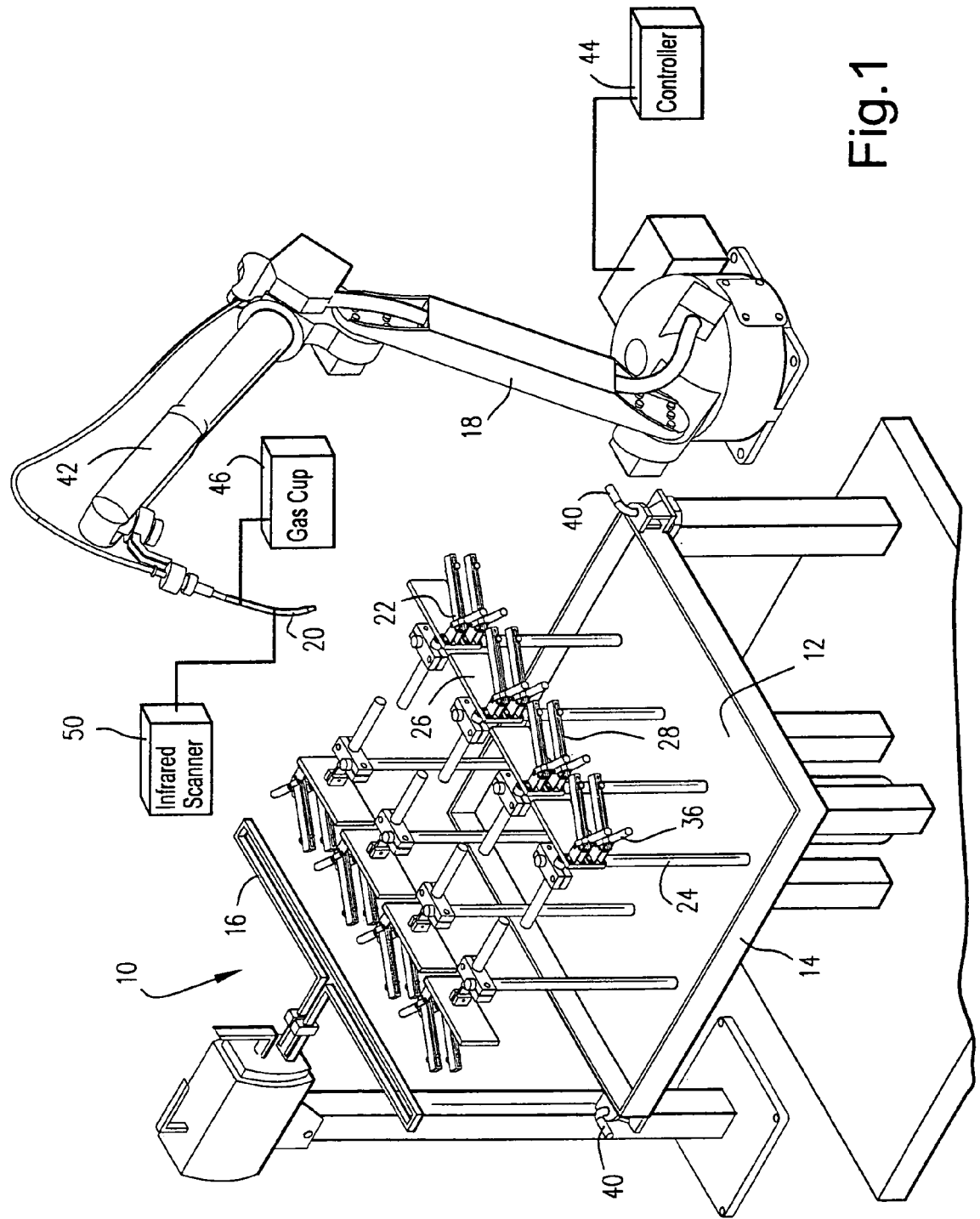
FIG. 1 is a fragmentary schematic illustration of an apparatus for providing weld build-up on the tips of turbine buckets.

Referring to the drawings, particularly to FIG. 1, there is illustrated an assembly, generally designated 10, for preheating and applying weld build-up material on the tips of turbine buckets at a production rate with increased quality and reduced repair cycle time. The assembly illustrated in FIG. 1 includes a fixture 12 comprising a table 14 mounted for rotation about a vertical axis. The assembly also includes an induction heater coil 16 and a robot 18 mounting a welding head 20.

Figure 2:
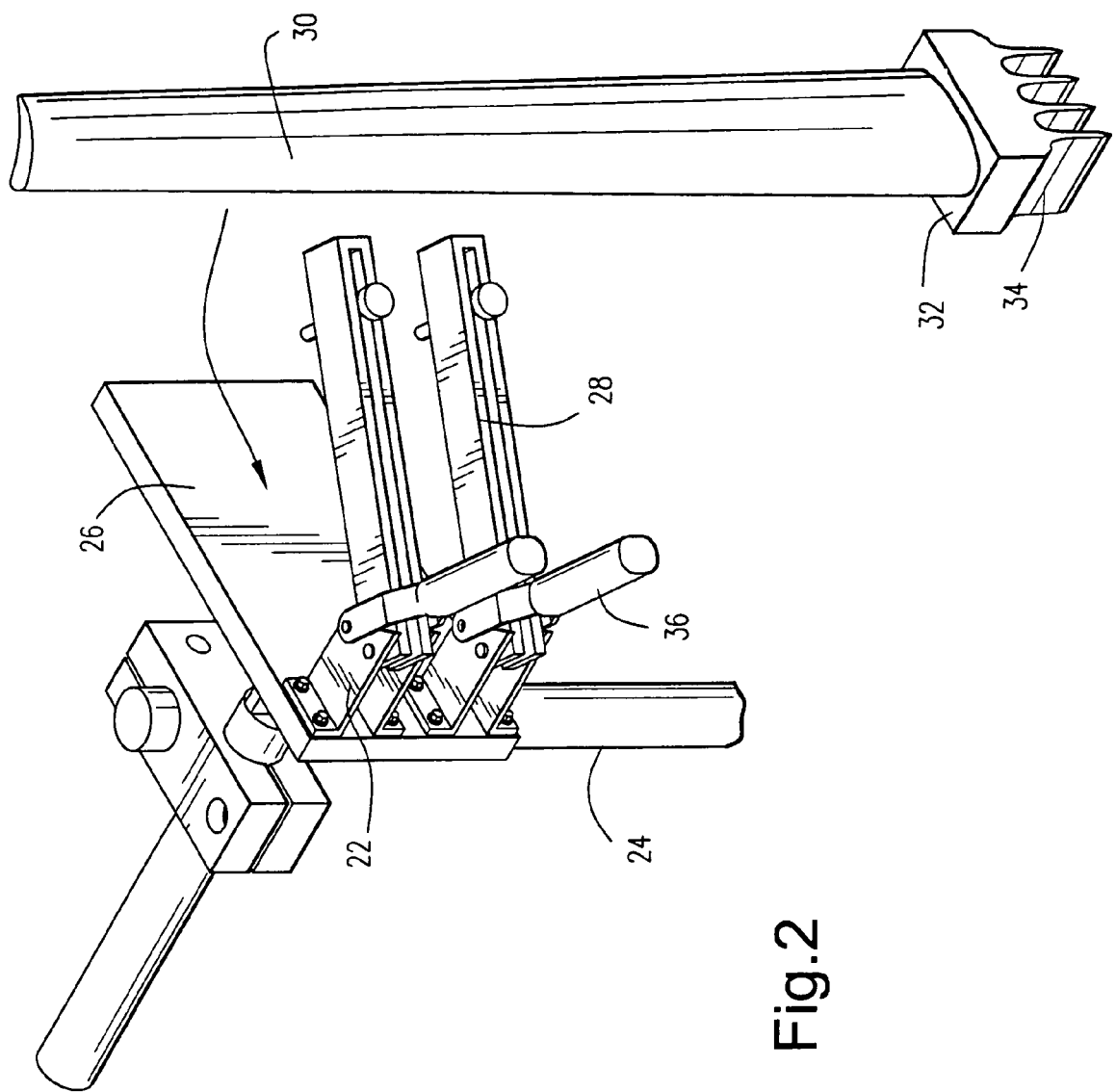
FIG. 2 is a fragmentary perspective illustration of the step of clamping a bucket to the fixture illustrated in FIG. 1.
Figure 3:
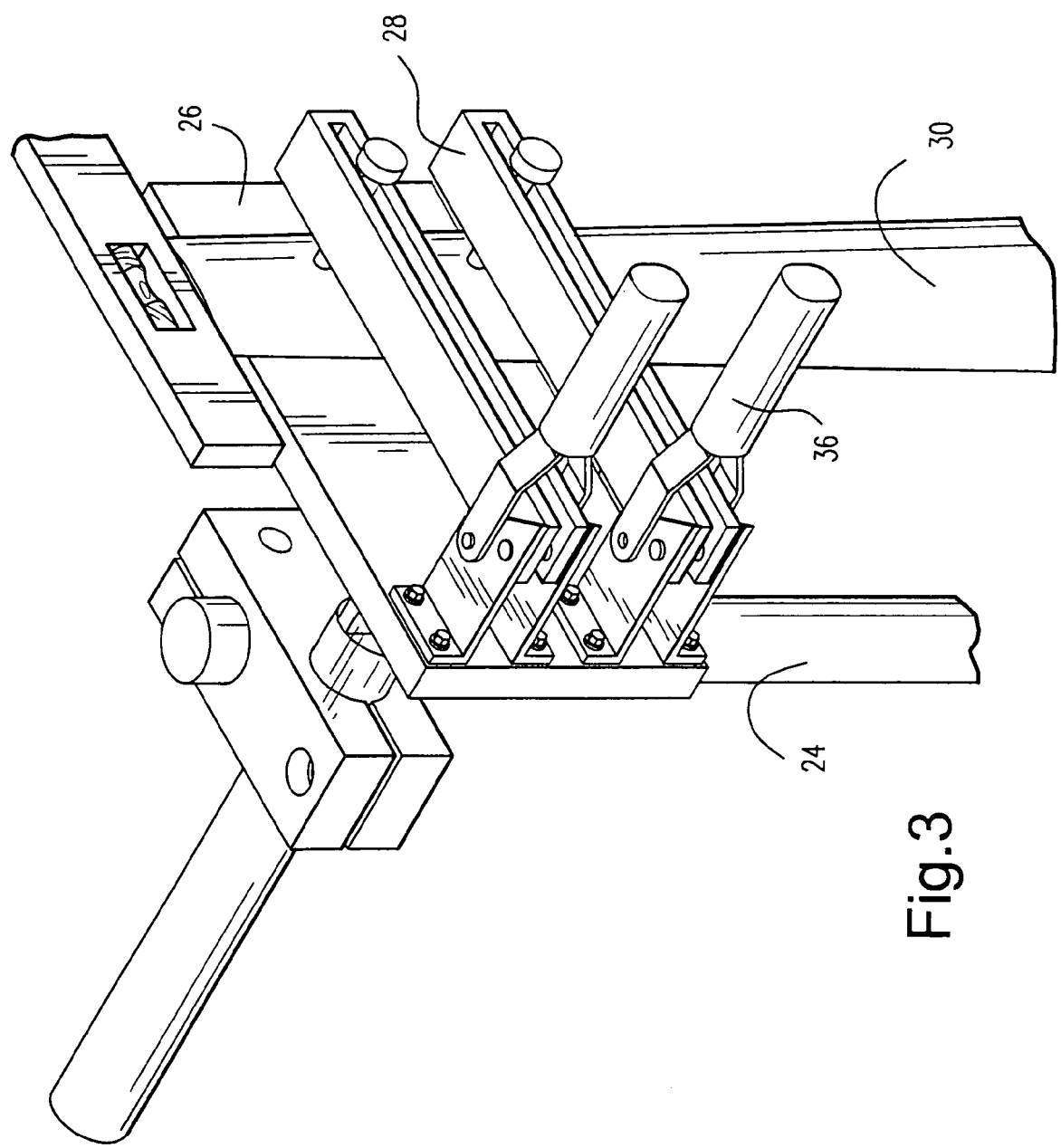
FIG. 3 is a view similar to FIG. 2 illustrating a bucket tip clamped to the fixture.
Figure 4:
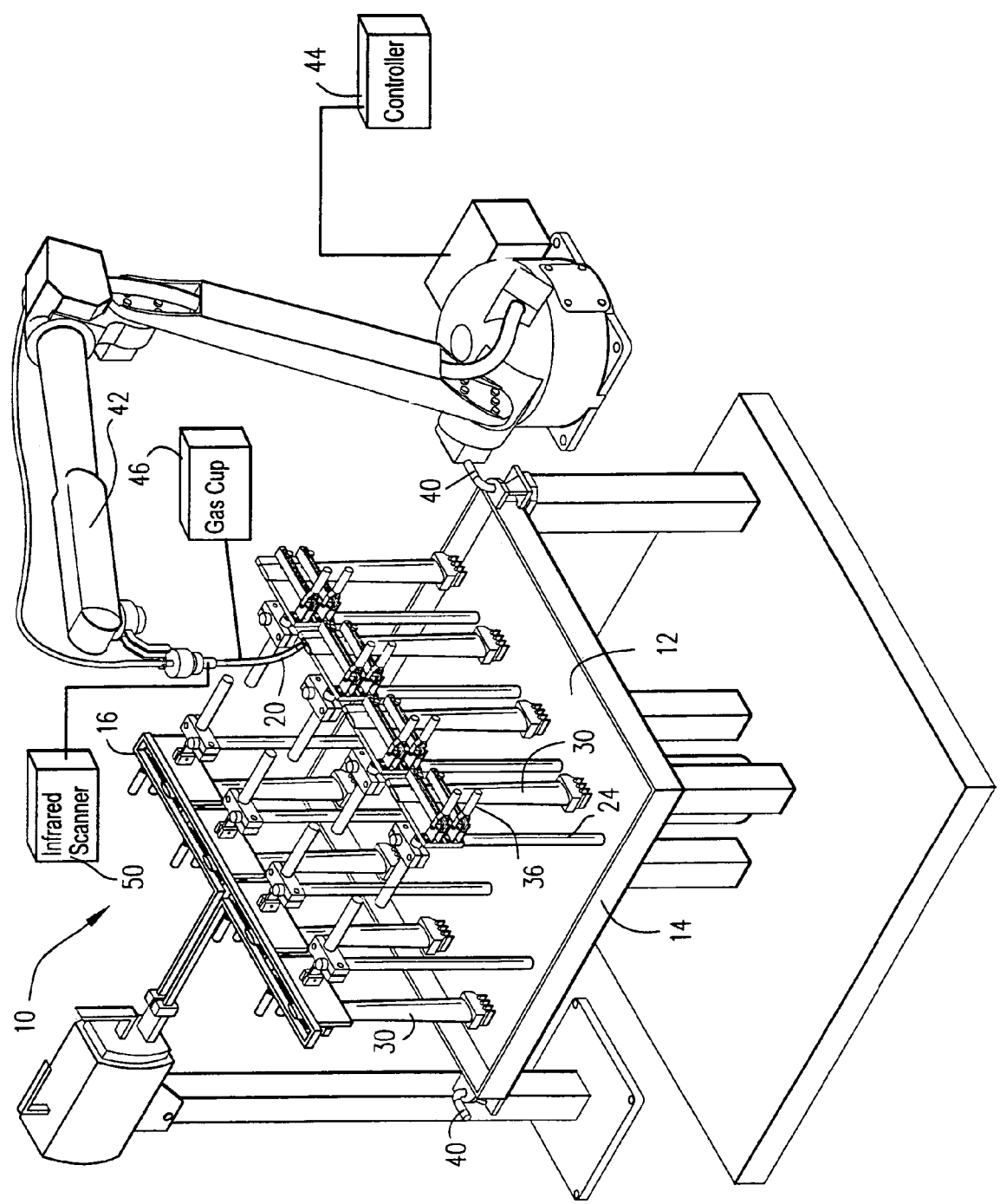
FIG. 4 is a view similar to FIG. 1 illustrating the application of the induction heating coil and the weld build-up provided by the welding head carried by the robotic arm of an industrial robot.

Particularly, table 14 includes a plurality of upstanding mechanical over-center clamps 22. The clamps are mounted on uprights 24 carried by table 14 and include a stop 26 and movable arms 28 (FIGS. 2 and 3). The clamps 22 are per se conventional and are used to clamp the upper ends of the buckets 30 against the stop 26 in predetermined positions. It will be appreciated that the bucket 30 includes a platform 32 and a dovetail 34, the latter dovetail 34 resting on the top of the table 14, while the upper end of the bucket 30 is clamped between the arms 28 and stop 26 as illustrated in FIG. 3. The clamps 22 are provided with handles 36 by which the clamps can be manually positioned to clamp the buckets in the predetermined positions as illustrated in FIG. 4.

As illustrated in FIG. 1, the clamps 22 are arranged in two groups of four clamps each along opposite sides of the table 14. It will be appreciated that a fewer or greater number of clamps 22 in each group (and hence buckets 30) may be provided and that the groups of clamps need not be aligned along opposite sides of the table but may be aligned at other angular orientations relative to one another. The table 14 is pivotable about a central vertical axis to locate the groups of clamps and, hence, the clamped buckets in respective positions adjacent the induction heater coil 16 and the robot 18 and, particularly, the welding head 20 carried by robot 18. In the illustrated preferred embodiment, the clamps are mounted along opposite sides of the table 14 and, accordingly, the table 14 is rotatable 180° between positions locating each group of buckets adjacent the induction heater coil 16 and adjacent the welding head 20 in welding positions such that the welding head 20 can provide weld buildup on the tip of each bucket in each group. The table 14 may be locked in each of the two rotatable positions by corner pins 40 locking the table to fixed stanchions.

The induction heater coil 16 lies to one side of the table 14 adjacent a group of buckets clamped to the table by clamps 22. The induction heater coil 16 preheats the buckets without contact with the buckets whereby the cross-sections of the airfoils adjacent the bucket tips are substantially uniformly heated. Preferably, the induction coil preheats the bucket airfoils to a temperature of about 450° F. The robot 18 may be of conventional construction, including a manipulator arm 42, a controller 44 for controlling the movement of the welding head 20 carried at the tip of the arm and a gas cup 46 for providing the inert gas atmosphere for providing weld buildup on the tips of the turbine buckets. It will be appreciated that the robot is programmable to apply weld material 43 onto the tips of the buckets when the bucket tips are located in welding positions. Thus, the robot can be programmed, i.e., taught to apply welding material sequentially to the bucket tips at the various locations of those bucket tips clamped to table 14 along the one side thereof. Additionally, and for reasons noted below, the robot also carries an infrared scanner 50 such that the temperature of each bucket tip can be ascertained prior to welding. The robot 18 may be of the type manufactured and sold by Daihen, Inc. of Tipp City, Ohio and identified under their trade name of OTC-Almega X Series.

Figure 6:
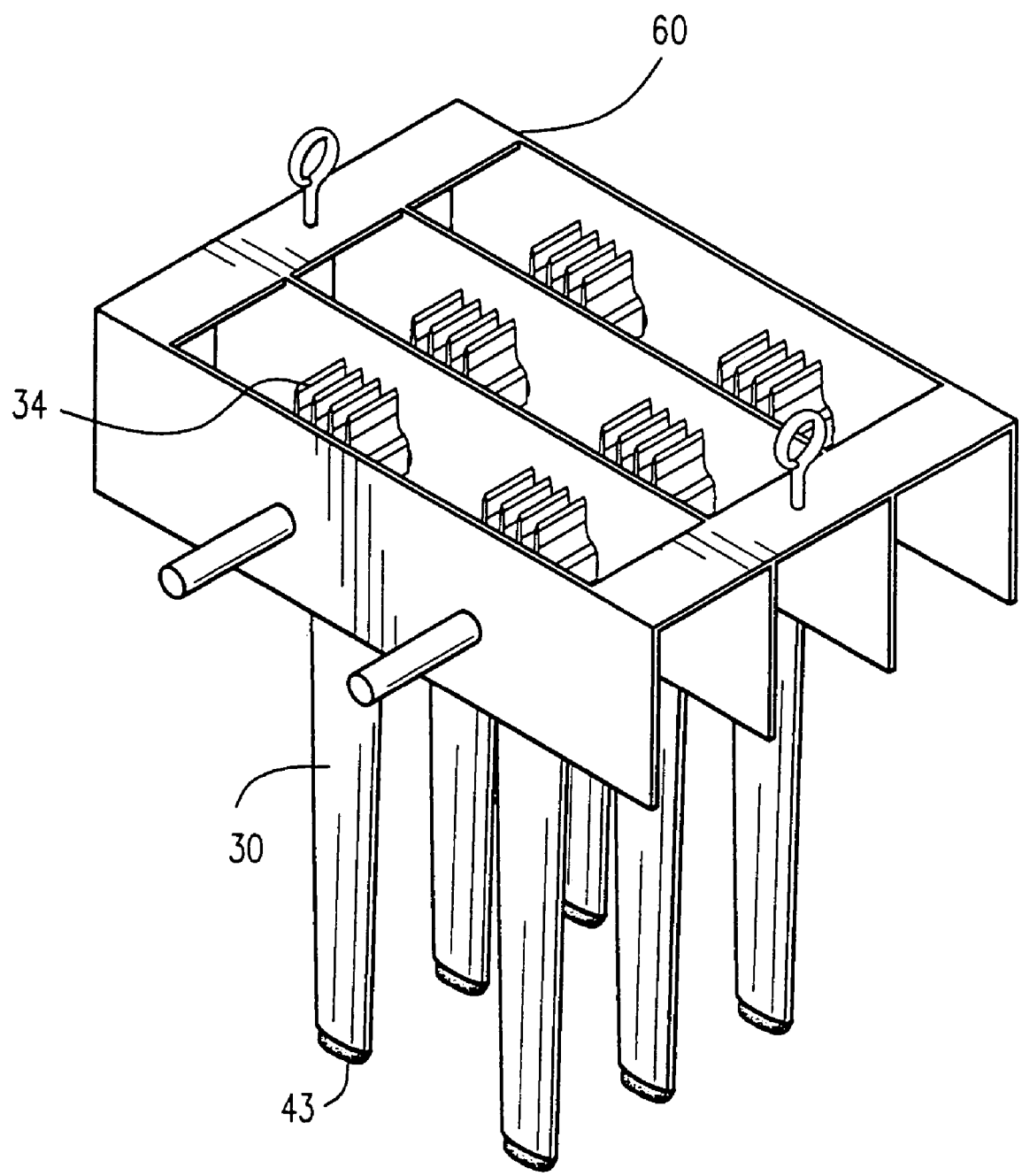
FIG. 6 is a perspective view of a further fixture for holding the buckets with the weld build-up on the tips in an inverted position.
Figure 7:
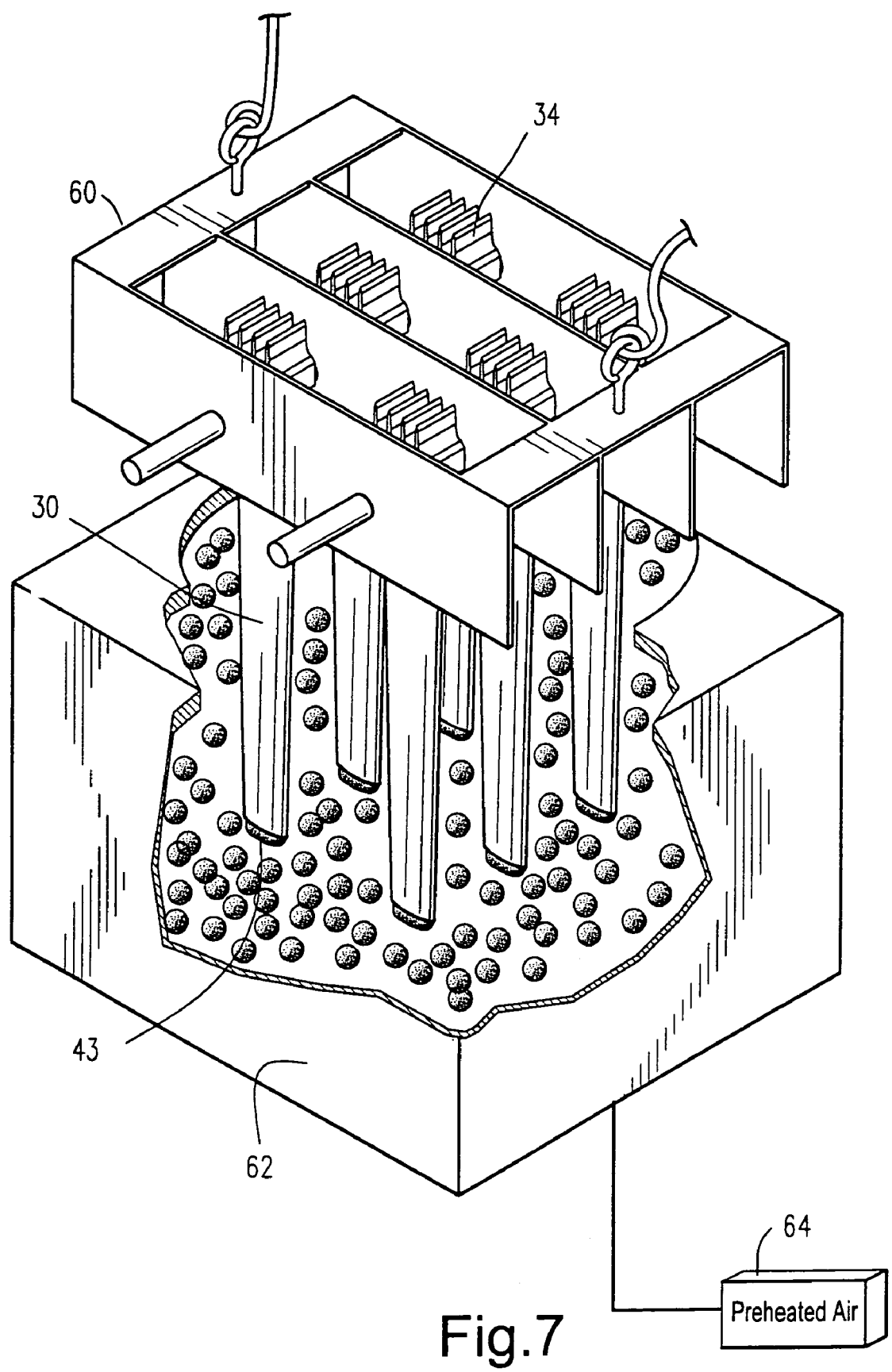
FIG. 7 is a view similar to FIG. 6 illustrating the immersion of the weld build-up on the bucket tips into a fluidized bed for stress relief.
Figure 8:
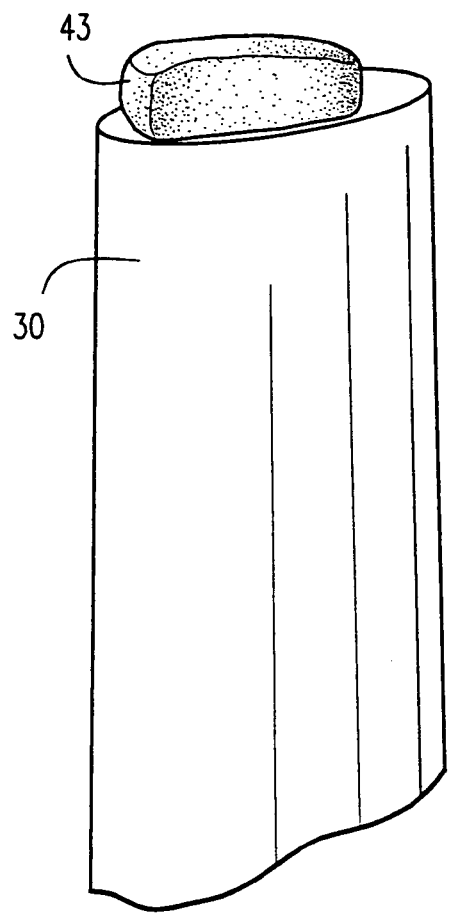
FIG. 8 is an enlarged schematic fragmentary view illustrating a weld build-up on the tip of a bucket.
Figure 9:
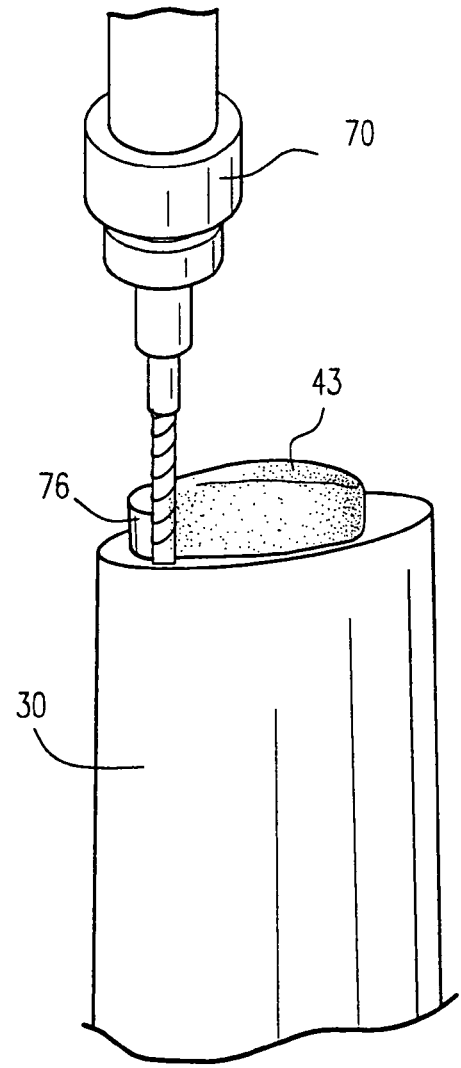
FIG. 9 is a schematic illustration of a CNC machine grinding the weld build-up to form tenons.
Figure 10:
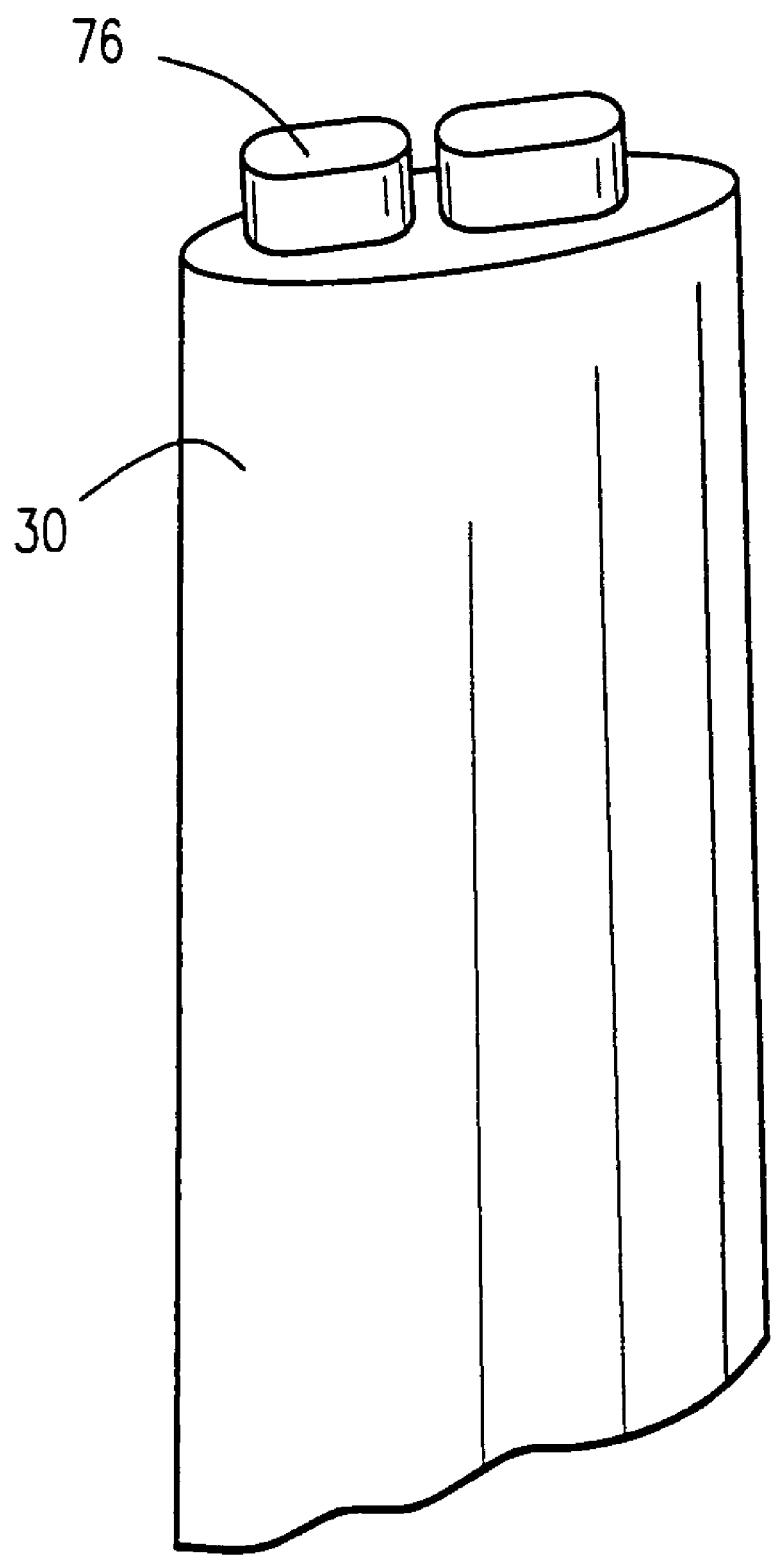
FIG. 10 is a perspective view of the bucket tip illustrating the finished tenons on the tip.

Referring to FIGS. 6 and 7, there is also provided an additional fixture or support 60 for supporting the buckets in inverted positions with the weld buildup material on the depending tips of the bucket. Thus, when sufficient weld buildup material has been applied to a group of buckets, the buckets are manually removed from the clamped positions on the table and inserted into the support 60. In FIG. 7, the support 60 is illustrated with the bucket tips, including the weld buildup, immersed in a fluidized bed 62. The fluidized bed 62 may be of the type including a container holding small metal or ceramic beads which are fluidized within container 62 by heated air supplied to the bottom of the container 62 for flow upwardly in and about the beads and outwardly through the top of the container. The supply of preheated air, schematically illustrated at 64, may be provided by an electrical or gas furnace, not shown, and blown into the container 62. By dipping tips of the buckets including the weld buildup material on each bucket tip into the container 62, the high temperature stress-relieves the buckets by the application of a substantially uniform temperature to the buckets. Once the stress-relief has been performed, the weld buildup illustrated in FIG. 8 can be subsequently machined, e.g., by a CNC machine, schematically illustrated at 70 in FIG. 9 to form the bucket tenons 76 illustrated in FIG. 10.

A description of the process of refurbishing the tenons on the buckets will now be described. As will be appreciated, over extended time and usage of the turbine, particularly steam turbines, the originally manufactured tenons abrade and erode away, requiring the bucket to be refurbished to provide new tenons so that the covers may be secured to the refurbished buckets. Thus, the buckets with the eroded or corroded tenons are removed from the turbine and the damaged tenons removed from the bucket tips by a grinding operation, not shown. Once the bucket tips have been ground to a substantially flat configuration, the buckets are ready for refurbishment.

The buckets are disposed in an upright orientation on table 14 with their dovetails 34 resting on the table. Upper end portions of the bucket airfoils are clamped by clamps 22 into predetermined positions on the table. In the illustrated embodiment, a first group of buckets are clamped along one side of the table, for example, the side of the table adjacent the induction heater coil 16. The buckets are clamped in predetermined positions corresponding to positions preprogrammed into robot 18 such that the robot will apply weld buildup at predetermined welding locations upon rotational movement of the first group of preheated buckets into a welding location adjacent the welding head 20. With the first group of buckets clamped in predetermined positions adjacent the induction heating coil 16, coil 16 is actuated to preheat the buckets to a predetermined temperature, for example, 450° F. Upon reaching the predetermined temperature, the table 14 is rotated about the vertical axis, in this instance about 180°, to locate the preheated buckets in the welding location. Once the table has been rotated, a second group of buckets are clamped to the table along the side thereof adjacent the induction heating coil 16. It will be appreciated that while the first group of buckets are in the welding location and weld buildup material is being applied to the bucket tips, the second group of buckets along the opposite side of the table are being preheated by the induction heating coil 16.

Figure 5:
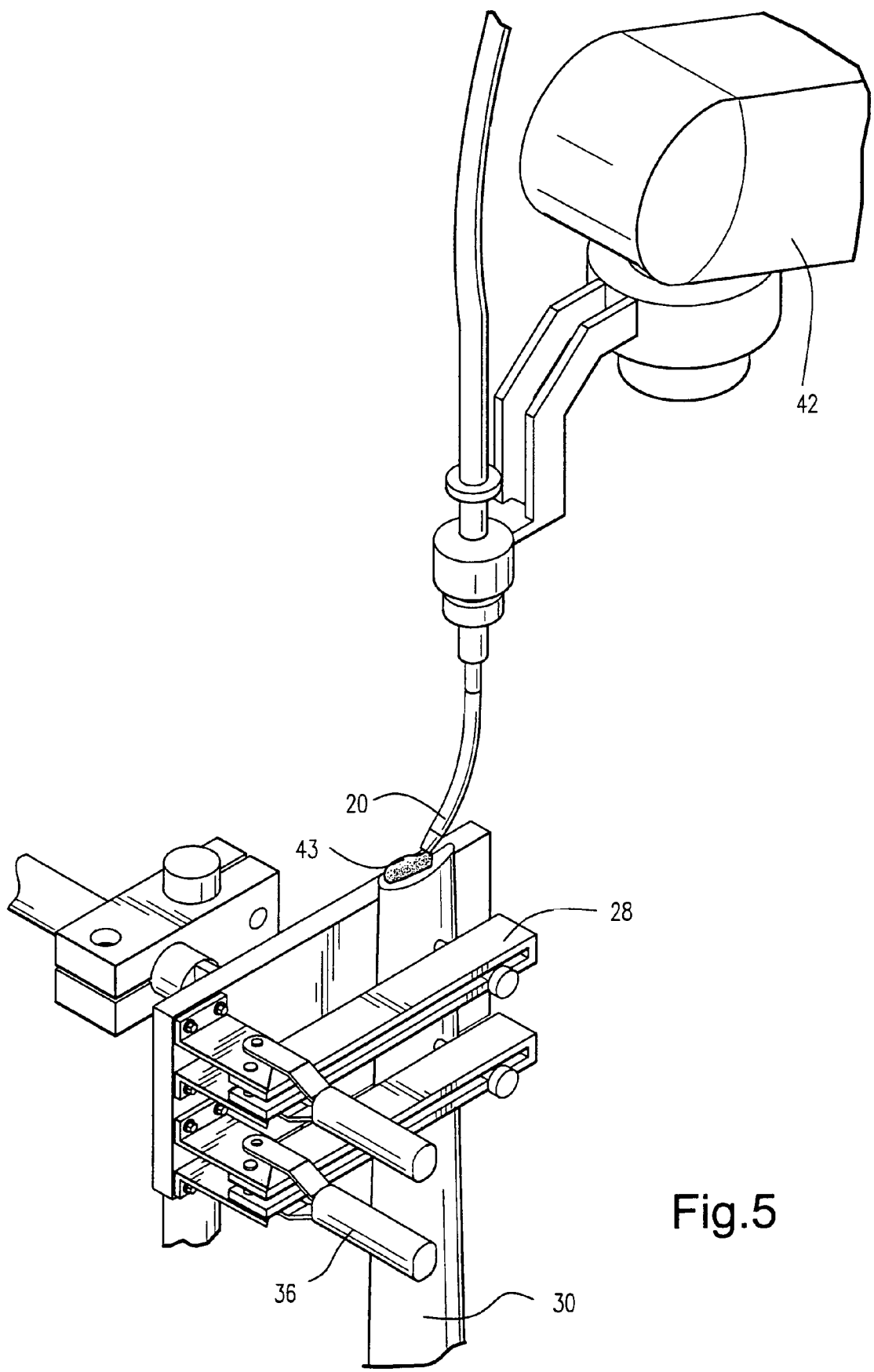
FIG. 5 is an enlarged illustration showing the weld build-up on the tip of a bucket tip.

With the first group of buckets in the welding location, the robot 18 is actuated to sequentially apply weld buildup to each of the preheated bucket tips. Specifically, the robot 18 is actuated to locate the welding head 20 including the gas cup 46, in proximity to the preheated bucket tip as illustrated in FIG. 5. The infrared scanner 50 scans the bucket tip to ensure that adequate preheat remains in the bucket tip to enable application of weld material. The welding technique may be one of many welding techniques. For example, using a MIG system, wire is continuously fed through a thimble on the gas cup and $CO_2$ or argon gas or a mixture thereof is dispersed to cover the weld. This shielding gas drives away the atmosphere and shields the welding head, enabling application of weld material to the bucket tip. Upon applying a predetermined quantity of weld buildup material, the pattern memory control of the robot causes the robot arm to move the welding head from the first bucket tip to the second bucket tip of this first group of buckets where the process of applying weld buildup material is repeated. The scanner 50 reads the temperature and, if appropriate, weld buildup material is applied to the second bucket tip. The robot is sequenced to apply weld buildup material in a first pass to each of the bucket tips of the first group of buckets in the predetermined positions on the table and in the welding locations. The application of weld buildup material is limited to restrict the magnitude of heat being absorbed by the bucket. The infrared scanner monitors the temperature at each bucket tip prior to applying weld material. If the monitored temperature is too high, the robot stops the welding sequence until the appropriate temperature is reached. Conversely, if the tip temperature is too low for adequate welding, additional heating may be supplied.

Upon completion of a first pass applying weld buildup material to each of the bucket tips in the first group of buckets in the welding locations, the robot displaces the arm to provide a second pass and additional weld material along each of the bucket tips. Thus, additional weld buildup material is provided in sequence to each bucket tip, similarly as the first pass. Thus, multiple welding passes are performed until the required buildup of weld material has been achieved.

It will be appreciated that the sequencing and fixturing provides two functions. First, it positions the welding head at the start of each weld at the same location for each bucket tip, thus ensuring consistency of the applied weld material. Further, it enables adequate time for the heat generated during the welding process to dissipate and travel through the material by conduction. This timing and sequencing, along with the monitoring of the bucket temperature, provides the temperature stability control, enabling an increase in production rate.

Once the weld buildup is complete on the first group of buckets, the buckets are removed from the table 14, inverted and located in the support 60. Upon removal of the first group of buckets from the table 14, the table is rotated to locate the next group of buckets on the opposite side of the table in the welding location. That second or next group of buckets has been preheated to proper welding temperature and the welding process is repeated. Additional buckets are also located in the now empty predetermined positions adjacent the induction coil 16 to preheat those additional buckets as the previously preheated group of buckets is being welded.

The first group of buckets removed from the table 14 with appropriate weld buildup are located in support 60. Support 60 supports the buckets in inverted positions, enabling the buckets to be dipped into the fluidized bed 62 for stress relief. After stress relief, for example, for about twenty minutes, the buckets are removed from the fluidized bed, wrapped in an insulating blanket, not shown, and slowly cooled. After cooling, the weld buildup material on the bucket tips is subsequently machined, for example, by a CNC machine, to form tenons 76. After machining, the bucket is now fully refurbished and restored, enabling bucket covers to be applied to the bucket tips.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An assembly for applying weld material to tips of turbine buckets to form one or more tenons on said bucket tips, comprising:
    a fixture having clamps for releasably securing first and second groups of buckets at predetermined discrete positions on said fixture;
    an induction coil for preheating said groups of buckets;
    a welding head for applying weld material to the tips of the buckets;
    said fixture being movable between first and second positions, said fixture in said first position thereof locating said first group of buckets adjacent said weld head enabling weld material to be applied to the tips of the buckets of said first group, and said second group of buckets adjacent the induction coil for simultaneous preheating the bucket tips of said second group;
    said fixture in said second position locating said second group of buckets adjacent said welding head, enabling weld material to be applied to the tips of the buckets of said second group thereof.

2. An assembly according to claim 1 including a robot carrying said welding head and programmed to locate the welding head in positions to apply weld material sequentially to the bucket tips of said groups of buckets.

3. An assembly according to claim 1 including a temperature sensor for sensing the temperature of the preheated buckets and coupled to said robot to enable application of weld material to the bucket tips only upon sensing a temperature in a predetermined range of temperatures.

4. An assembly according to claim 1 wherein said clamps are arranged in two groups of four on opposite sides of said fixture.

5. An assembly according to claim 1 wherein said fixture is rotatable bout a central vertical axis.

6. An assembly according to claim 1 wherein each clamp is provided with a handle by which the clamp can be manually positioned to clamp the buckets in said positions.

7. An assembly for applying weld material to tips of turbine buckets to form one or more tenons on said bucket tips, comprising:

a fixture having clamps for releasably securing first and second groups of buckets at predetermined discrete positions on said fixture;

an induction coil for preheating said groups of buckets;

a welding head for applying weld material to the tips of the buckets;

said fixture being movable between first and second positions, said fixture in said first position thereof locating said first group of buckets adjacent said weld head enabling weld material to be applied to the tips of the buckets of said first group, and said second group of buckets adjacent the induction coil for simultaneous preheating the bucket tips of said second group;

said fixture in said second position locating said second group of buckets adjacent said welding head, enabling weld material to be applied to the tips of the buckets of said second group thereof; and including a robot carrying said welding head and programmed to locate the welding head in positions to apply weld material sequentially to the bucket tips of said groups of buckets.

* * * * *